United States Patent
Philbrick et al.

(10) Patent No.: US 12,050,706 B1
(45) Date of Patent: Jul. 30, 2024

(54) SECURITY SHARING SYSTEMS AND METHODS

(71) Applicant: United Services Automobile Association (USAA), San Antonio, TX (US)

(72) Inventors: Ashley Raine Philbrick, San Antonio, TX (US); Ryan Thomas Russell, The Colony, TX (US); David Joaquin Harris, San Antonio, TX (US); Sacha Melquiades De'Angeli, San Antonio, TX (US)

(73) Assignee: United Services Automobile Association (USAA), San Antonio, TX (US)

( * ) Notice: Subject to any disclaimer, the term of this patent is extended or adjusted under 35 U.S.C. 154(b) by 611 days.

(21) Appl. No.: 17/129,143

(22) Filed: Dec. 21, 2020

Related U.S. Application Data (60) Provisional application No. 62/955,153, filed on Dec. 30, 2019.

(51) Int. Cl.
| | |
|---|---|
| G06F 21/62 | (2013.01) |
| G06F 21/00 | (2013.01) |
| G06F 21/44 | (2013.01) |
| G06F 21/45 | (2013.01) |
| G06F 21/56 | (2013.01) |
| G06F 21/57 | (2013.01) |

(52) U.S. Cl.
CPC .......... *G06F 21/6218* (2013.01); *G06F 21/44* (2013.01); *G06F 21/45* (2013.01); *G06F 21/566* (2013.01); *G06F 21/577* (2013.01)

(58) Field of Classification Search
CPC . H04L 63/14; H04L 63/1408; H04L 63/1483; G06F 21/566; G06F 21/577; G06F 21/6218; G06F 21/44; G06F 21/45; G06F 21/53; G06F 21/50
See application file for complete search history.

(56) References Cited

U.S. PATENT DOCUMENTS

| | | | | |
|---|---|---|---|---|
| 10,243,989 | B1* | 3/2019 | Ding | H04L 63/145 |
| 2015/0381653 | A1* | 12/2015 | Starink | H04L 63/1441 |
| | | | | 726/22 |
| 2016/0371495 | A1* | 12/2016 | Bhat | G06F 21/445 |
| 2018/0091476 | A1* | 3/2018 | Jakobsson | H04L 63/1433 |

\* cited by examiner

*Primary Examiner* — Edward Zee
(74) *Attorney, Agent, or Firm* — Fletcher Yoder, PC (57) ABSTRACT

A computing device may include a memory storing a first dataset and a second dataset and a processor configured to provide an operating system. The computing device may also include a container defined by a programmed boundary within at least the memory and provided by the operating system. A resource executed within the container may access the first dataset without accessing the second dataset. However, the resource may access the second dataset in response to a generation of a certificate. The resource may originate from following a hyperlink in a communication.

13 Claims, 3 Drawing Sheets

SECURITY SHARING SYSTEMS AND METHODS

CROSS-REFERENCE TO RELATED APPLICATION

The present disclosure is related to, and claims priority to, U.S. Provisional Application No. 62/955,153, entitled "Security Sharing Systems and Methods," which was filed on Dec. 30, 2019, and which is herein incorporated by reference in its entirety for all purposes.

BACKGROUND

The present disclosure generally relates to computing device monitoring, and more particularly, security systems designed to monitor for unauthorized data sharing.

Computing devices increasingly are connected to other devices, such as other computing devices, memories, servers, or the like, through wireless and/or wired communication networks. As popularity of computing devices has grown, an amount of sensitive data shared through the communication networks has increased. When an unauthorized entity accesses the sensitive data, a security breach may occur and result in a "data leak," or a release of sensitive data as part of an unauthorized access of the sensitive data. Sensitive data may include social security numbers, personal identification numbers, financial information, credit or debit card information, banking information, login credentials for website portals, or the like. Different techniques may be used by an unauthorized party to access the sensitive data stored and/or transmitted by a computing device, such as key logging techniques, phishing methods, viruses, or the like. For example, phishing methods may enable unauthorized parties inadvertent access to the sensitive data. In particular, some phishing attacks may cause installation of software-based keyloggers that may use key logging techniques which may retrieve sensitive data through user inputs via an input device, such as a keyboard, of a computing device. Phishing attacks remain troublesome to detect and thwart due to increasing exploitation of social engineering (e.g., by making communications look increasingly genuine), among other reasons.

BRIEF DESCRIPTION

Certain embodiments commensurate in scope with the originally claimed subject matter are summarized below. These embodiments are not intended to limit the scope of the claimed invention, but rather these embodiments are intended only to provide a brief summary of possible forms of the invention. Indeed, the present disclosure may encompass a variety of forms that may be similar to or different from the embodiments set forth below.

In an embodiment, a computing device may include a processor that provides or executes an operating system, a container defined by a programmed boundary within at least a memory and provided by the operating system, and the memory that stores the first dataset within the programmed boundary and a second dataset outside the programmed boundary. The container may, based upon the programmed boundary, provide a resource access to the first dataset within the programmed boundary, while refraining from providing the resource access to the second dataset outside the programmed boundary. The resource may access the first dataset within the programmed boundary, and, in response to receiving a certificate authorizing access to the second dataset outside the programmed boundary, access the second dataset using the certificate.

In another embodiment, a method for operating a phishing detection system of a computing device may include receiving, via a computing device, a first dataset generated in response to a first communication, such as from an input/output port and/or from processing circuitry determining the first dataset from the first communication. The method may include determining, via the computing device (e.g., via a processor of the computing device), that the first dataset is a threshold amount of deviation from an expected dataset generated based at least in part on a second communication received before or with the first communication. The method may include, in response to determining that the first dataset is the threshold amount of deviation from the expected dataset, detecting, via the computing device (e.g., via a processor of the computing device), a likely phishing operation. The method may also include executing, via the computing device (e.g., via a processor of the computing device), a hyperlink of the first communication within a container provided by an operating system of the computing device. The container includes a programmed boundary that restricts access outside or beyond the programmed boundary.

In yet another embodiment, a tangible, non-transitory computer-readable medium that stores instructions executable by a processor of an electronic device that, when executed by the processor, cause a computing device to perform operations including accessing a resource to be executed within a container data structure. The container data structure may provide a programmed boundary within at least a memory of the computing device that enables resource access to a first portion of the memory within the programmed boundary while restricting access to a second portion of the memory outside the programmed boundary. The operations may include executing the resource within the container data structure, and may include, at a first time, restricting access of the resource to a dataset in the second portion of the memory. The operations may include, at a second time, refraining from restricting the access of the resource to the dataset, by issuing a one-time certificate to the resource, permitting access of the resource to the dataset.

BRIEF DESCRIPTION OF THE DRAWINGS

These and other features, aspects, and advantages of the present disclosure will become better understood when the following detailed description is read with reference to the accompanying drawings in which like characters represent like parts throughout the drawings, wherein.

DETAILED DESCRIPTION

One or more specific embodiments of the present disclosure will be described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present disclosure, the articles "a," "an," and "the" are intended to mean that there are one or more of the elements. The terms "comprising," "including," and "having" are intended to be inclusive and mean that there may be additional elements other than the listed elements. Additionally, it should be understood that references to "one embodiment" or "an embodiment" of the present disclosure are not intended to be interpreted as excluding the existence of additional embodiments that also incorporate the recited features.

Home and business users may use computing devices, such as cellular phones, laptops, smart devices, or the like, to conduct personal or work-related operations. These computing devices may store sensitive information (e.g., sensitive data of one or more users and/or customers) and/or receive sensitive information via input devices coupled to the computing device. For example, an operator of the computing device may enter personal information via the input device for use with one or more processing operations of the computing device. The computing device may couple to a communication network (e.g., wired network, wireless network) and may transmit the sensitive information via the communication network. Although sensitive information handled by a computing device may appear secure, monitoring techniques exist that enable an unauthorized computing device (e.g., a computing device belonging to an unauthorized operator) access to the sensitive information. For example, an unauthorized operator may use keylogging devices (e.g., keylogger device) and/or phishing techniques to access the sensitive information. Improved detection and/or mitigation systems and methods may be desired to improve techniques to thwart unauthorized access to the sensitive information.

In general, phishing operations are difficult to detect and identity fraud resulting from information phishing may go unnoticed. However, a phishing detection system implemented via a computing device may monitor communications of the computing device to protect against these phishing operations. For example, the computing device may detect fraudulent communications associated with a phishing operation when a received communication deviates from a purchasing history associated with the computing device, such as when a destination address of a payment (e.g., a web site to pay, a physical address to mail to) does not match an originating address of an invoice (e.g., a company said to have generated the invoice, a company that an order was made to which resulted in the invoice). The computing device may additionally or alternatively protect against phishing operations by leveraging containers to isolate processes, such as processes that are unconfirmed as authorized. Examples of processes may include applications and/or execution files that are executed when a hyperlink included in a communication is selected (e.g., digitally actuated, followed). When a process is authorized (e.g., determined to not be associated with a phishing operation), the computing device and the process may be permitted to communicate. As used herein, the term "container" and "sandbox" may be used interchangeably.

A container may be a programmed boundary provided by software installed on the computing device and/or executed by the computing device to provide an application. Operating system (OS)-level virtualizations may deliver software in packages referred to as containers. Containers may be isolated from one another and/or from processes of a host computing device and bundle respective software, libraries, and/or configuration files to maintain the isolation. In some cases, containers may communicate with each other and/or portions of the host computing device through well-defined channels, which may include an authentication process that verifies the communication is permitted.

In this way, containers may be considered data structures provided by the operating system of the computing device and/or one operating system may provide one or more containers programmatically isolated from each other and from the operating system and/or the computing device. Furthermore, in some cases, the computing device may use a container to isolate execution of a browsing session, such as an Internet-based browsing session, that permits trusted links between the computing device and the Internet-based browsing session without permitting untrusted links. For example, the computing device may use a container to isolate execution of a computing network (e.g., a network associated with supporting computing devices of an enterprise and/or collection of enterprises) and permit trusted links to or from the isolated execution without permitting untrusted links access to the computing device and/or the isolated execution. Based on the programmed boundary, the container may provide access to a first dataset from within the programmed boundary and prevent or refrain from providing access to a second dataset outside the programmed boundary.

Detecting fraudulent communications may involve the computing device recording information corresponding to a user of the computing device and/or to purchases of the user over time as expected user information (e.g., expected properties attributed to the user and/or purchases of the user). When the computing device receives a communication that includes information (e.g., fields, text, receipts) that deviate from the expected user information, the computing device may determine that a phishing operation generated the communication. The information may deviate from the expected user information when one or more descriptions of the communication are not the same as the expected user information, and thus a context of the communication is different. For example, a user may have purchased an item, and thus the expected user information may identify the item, an address of the user, an address of the seller of the item, indicators (e.g., text identifying) the seller of the item, or the like. When the communication includes additional properties or information that are not indicative of the expected user information but is determined to be mimicking an authorized communication associated with the purchase of the item, the computing device may identify the communication as a fraudulent communication. For example, the computing device may determine a threshold amount of similarity between information of the communication and the expected user information and/or a threshold amount of deviation between information of the communication and the expected user information, and may use the one or more thresholds to identify when the communication is a fraudulent communication. In this way, the computing device may monitor an electronic mail (email) transmitted to the user of the computing device to identify whether the email mimics an email indicative of the purchase of the item but deviates by a threshold amount of information, and thus is to be considered a fraudulent communication. A fraudulent purchase of the item is just one example of a fraudulent communication, and other examples may include fraudulent follow-up emails from a company, fraudulent emails requesting information technology-related actions (i.e., account deactivation or expiration warnings), fraudulent emails appearing to come from a governmental entity, or the like. Quantifying an amount of deviation between a datasets and expected data may include analyzing textual data, analyzing a time of receipt, analyzing a sender address or name, analyzing a destination address of an embedded link or attached file, analyzing store names, addressing, phone numbers, or the like. Datasets may be parsed to extract a subset of data, such as store name, a store address, a store phone number; a purchase amount, or any combination thereof. The parsed data (e.g., extracted subsets of data) may be compared to each other to quantify an amount of deviation, such as a number of extracted data that match or a percentage of matching data. These comparisons may be done field-by-field, done letter-by-letter (e.g., when the fields are concatenated into one string and letter-by-letter analysis is performed for the parsed data).

In some cases, the computing device may use a container to protect against phishing operations additionally or alternatively to the detection of fraudulent communications. For example, the computing device may use a container to isolate a process, such that the computing device permits authorized (e.g., trusted) links between the process and computing device across a boundary of the container and does not permit unauthorized (e.g., untrusted) links across the boundary of the container. The computing device may place its own operations and/or execution of processes within a container and may permit authorized links to and/or from the container to cross the boundary of the container. In some embodiments, the computing device may additionally or alternatively manage Internet-based browsing sessions within one or more containers. Thus, if a selection of a hyperlink (e.g., a rendered visualization of a Uniform Resource Locator (URL) that is programmatically followed to a file storage location, website-based storage location, and/or cloud-based storage location) and/or process were to call on (e.g., spins, spun) an unauthorized operation, the computing device may stop the operation at the boundary of the container. Stopping unauthorized operations at the boundary of the container may reduce or prevent the likelihood of an unauthorized party gaining access to information of the computing device.

In some cases, the computing device may identify authorization of a process to access information outside of the container. The computing device may verify whether an updated version of the container matches a most-recent update issued for the container (e.g., to determine that security features of the container are up to date). When the container is determined to be out-of-date (e.g., does not have the most up-to-date software update installed), the computing device may update the container. When the container is determined to be up-to-date and/or after the container is updated, the computing device may authorize the process to access information of the computing device. The container may be provided using hash-based encryption, such that information within the container is separate and inaccessible by software of the computing device external to the container.

Figure 1:
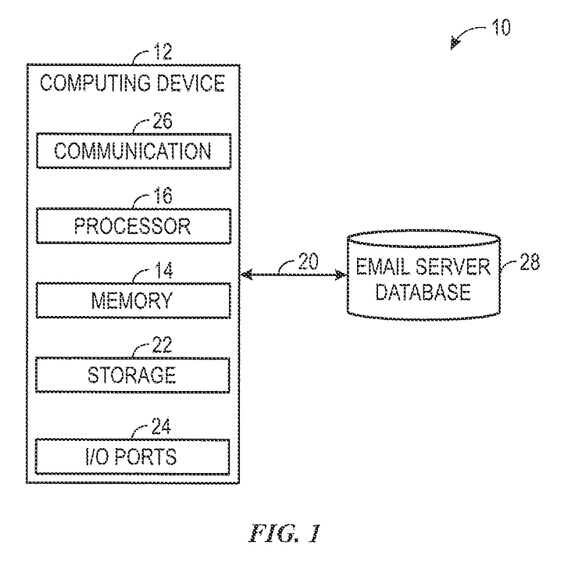
FIG. 1 is a block diagram of an example a computing device operating as a phishing detection system, in accordance with embodiments of the present techniques.

Keeping the forgoing in mind, FIG. 1 is an illustration of an embodiment of a computing system 10 that includes a computing device 12. The computing device 12 may perform operations based on instructions that may be stored in a memory 14. A processor 16 may retrieve the instructions and execute the instructions to cause the computing device 12 to perform operations, such as processing the user input and/or performing an operation in response to the user input. For example, the processor 16 may execute instructions stored in the memory 14 to implement a phishing detection system that monitors communications of the computing device 12 to protect against phishing operations. As described herein, when the computing device 12 is stated to monitor and/or detect phishing operations and/or protect against possible phishing operations, it may be understood that the phishing detection system implemented via the computing device 12 is monitoring and/or detecting phishing operations, and/or protecting against possible phishing operations.

The processor 16 may include processing circuitry used to run programs, execute instructions, interpret inputs, generate control signals, and/or other similar functions. For example, the processor 16 may be any suitable type of computer processor or microprocessor capable of executing computer-executable code, including but not limited to one or more field programmable gate arrays (FPGA), application-specific integrated circuits (ASIC), programmable logic devices (PLD), programmable logic arrays (PLA), and the like. The processor 16 may even, in some embodiments, include multiple processors.

The memory 14 may include any suitable article of manufacture that serves as media to store processor-executable code, data, or the like. The memory 14 may store processor-executable code used by the processor 16 to perform the presently disclosed techniques. Data may be transmitted between components of the computing system 10 via a communication network 20 to other devices connected via network and/or storage 22. The computing device 12 may couple to the communication network 20 through any number of input/output (I/O) ports 24. The I/O ports 24 may include or be associated with any suitable Universal Serial Bus (USB) port, registered jack port (e.g., RJ15, RJ11, or the like), any sort of antenna to receive wireless signals, user input devices (e.g., keyboards, mouse, or the like), or the like. In this way, the I/O ports 24 may be any suitable input and/or output device that permits data packets to be transmitted into the computing device 12 and/or that permits data packets to be transmitted from the computing device 12.

Additionally, or alternatively, the computing device 12 may include communication circuitry 26 to communicate via the communication network 20, and thus may include I/O interfaces and/or network interfaces. The communication circuitry 26 may sometimes include processing circuitry to prepare data for transmission through the communication network 20 and/or to prepare data for use by the computing device 12, such as by performing format changing to the data. The communication network 20 and/or the internet and/or storage 22 may include any number of input/output (I/O) ports or interfaces and/or network interfaces, despite not being expressly depicted in FIG. 1. Such a communication network 20 may enable data transmission over a variety of wired or wireless networks between components of the computing system 10. The wired or wireless networks may include networks such as a personal area network (PAN), BLUETOOTH®, a local area network (LAN) or wireless local area network (WLAN), such as WI-FI®, and/or for a wide area network (WAN), such as a cellular network, near-field communication technologies, mobile telecommunications technology (e.g., 2G, 3G, 4G, 5G, long term evolution (LTE)), ultra-wide band wireless radio technology, or the like. The communication circuitry 26 may include a network interface to enable communication via various protocols such as ETHERNET/IP®, CONTROL-NET®, DEVICENET®, or any other suitable communication network protocol. It is noted that the computing device 12 may include additional or fewer components as those depicted in FIG. 1. For example, the computing device 12 may omit memory 14 and instead use the data stores shared with additional computing devices.

As described, the computing device 12 may handle data. In some cases, the data handled by the computing device 12 is sensitive data. Sensitive data may be information represented through data that is undesired to be publicly known and/or is related to private information of an operator of the computing device, of customers of a business, of a business, or the like. For example, an operator of the computing device 12 may enter social security numbers, birthdates, address information, credit card, passwords, financial information, or the like, into the computing device 12 for use and/or storage in the computing device 12. Unauthorized computing devices may use techniques to access the sensitive data stored on and/or handled by the computing device 12. For example, an unauthorized operator may use a keylogger and/or phishing operations to access and store the sensitive information. In some cases, certain phishing operations may cause an installation of a keylogger on the computing device 12.

A phishing operation may use a keylogger to perform key stroke logging of inputs into the computing device 12. In this way, the keylogger may record the action of logging or striking the keys struck on an input device (e.g., a keyboard). When the input device is a keyboard, keys of the keyboard may be pressed and subsequently recorded by the keylogger. In some cases, the phishing operation may access information stored or used by the computing device 12 through other monitoring operations, such as data retrieval operations and/or data querying operations.

In general, the phishing operation may include use of a fraudulent communication used to retrieve information from the computing device 12 in a manner that aims to be genuine or believable to an operator of the computing device 12. For example, the phishing operation may include an attempt at a reasonable or logical communication explanation, such as an invoice for a fraudulent purchase that the operator may not identify as fraudulent. Sometimes, a phishing operation may be thwarted by the computing device 12 not executing a link or process until the link or process is able to be verified as authorized. However, sometimes execution of a yet-to-be-authorized process or link is unavoidable, thereby leaving the computing device 12 exposed to possible phishing attacks. Known information about the user and/or the user purchases may be used additional to or alternative of container process isolation methods to protect information of the computing device 12 from possible phishing attacks. Thus, the computing device 12 may access an email server database 28 to verify whether an incoming communication is expected relative to known information about the user and/or the user purchases accessible via a database, such as the email server database 28. Additionally, or alternatively, the computing device 12 may use a container to protect against phishing operations additional to or alternative of the detection of fraudulent communications. For example, the computing device 12 may access the email server database 28 to verify invoice numbers, purchase amounts, addresses (e.g., email address, physical address) related to the purchase, or the like, to authenticate an incoming communication claiming to be related to an invoice and/or a purchase.

Figure 2:
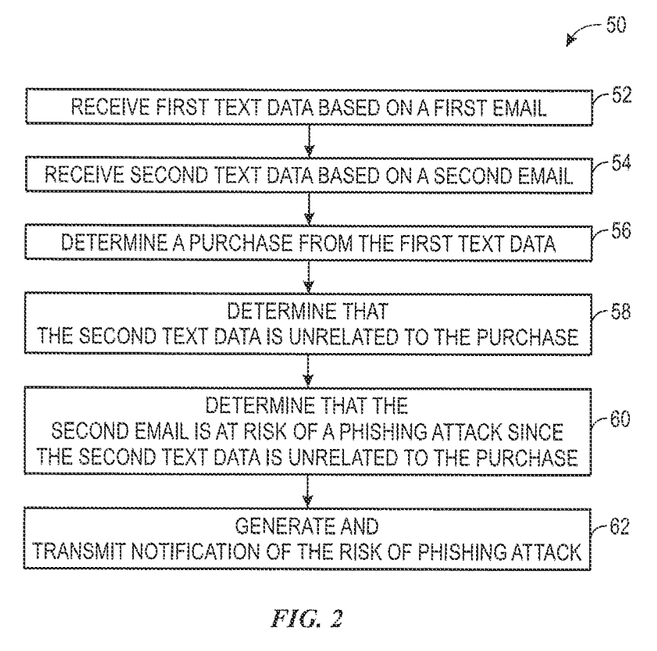
FIG. 2 is a flowchart of a method for detecting a phishing attack, in accordance with embodiments of the present techniques.

To elaborate, FIG. 2 is a flowchart of a first example method 50 for authorizing a communication based on user information and/or user purchase information. Although described as performed by the computing device 12, it should be understood that any suitable computing device and/or portion of the computing device 12 may perform, or facilitate performing, the method 50. It should be understood that although the method 50 is presented in a particular order, any suitable order of operations may be used to perform the method 50. Furthermore, it should be understood that some or all of the performance of operations of the method 50 may be facilitated by a processor executing instructions stored on a tangible, non-transitory memory or storage device (e.g., such as a processor 16 executing instructions stored in the memory 14).

With the above in mind, at block 52, the computing device 12 may receive a first dataset, such as a first text data (e.g., an expected dataset). The first text data may correspond to information included as part of a communication from another computing device and/or process, such as an email. The first text data may correspond to purchase information and/or identifying information of the user who ordered or purchased an item or service, such as an invoice identifier, a cost of purchase, an item purchased, a supplier of the item purchased, an address of the supplier, a web site used to purchase the item, a name of the user who purchased the item, an address of the user who purchased the item, a tracking number of a shipment of the item purchased, or the like. In some embodiments, the purchase information and/or user information may be stored in a database and accessed at block 52 in additional to or as an alternative to analyzing a received email.

At block 54, the computing device 12 may receive a second dataset, such as a second text data determined based on a second email and/or generated using information transmitted via the second email. The second email may be an unauthorized communication transmitted and/or generated by an additional computing device and may include a hyperlink to prompt the user to participate in a phishing operation. In this way, the second text data may deviate from the expected text data (e.g., the first text data) by a threshold amount of deviation.

At block 56, the computing device 12 may determine information associated with a purchase from the first text data. For example, the computing device 12 may identify that a purchase was made and may identify a shipping address, an originating address, a tracking number, an invoice identifier, or the like, to determine that the first email and/or the first text data corresponds to a verified and/or authorized purchase.

At block 58, the computing device 12 may determine that the second text data is unrelated to the purchase identified at block 56. For example, at block 56, the computing device 12 may determine that a first product was purchased and, at block 58, the computing device 12 may determine that the second text data is unrelated to the purchase of the first product, and is therefore an unauthorized communication. When the second email is mimicking a purchase email and/or a communication expected to be generated in response to an authorized purchase and/or the first text data and the second text data are determined to be unrelated, the computing device 12 may determine that the second email is unrelated to the purchase. When the second email is unrelated to the purchase, the computing device 12 may, at block 60, determine that there is an increased likelihood of phishing operation, and thus that the second email is at risk of being vulnerable to fraudulent activity (e.g., phishing operation). In response to determining that the second email is at risk of being associated with a phishing attack, the computing device 12, at block 62, may generate and transmit a notification indicative of the risk of the phishing attack. Sometimes, the computing device 12 may identify that the destination address of the second text data does not match the originating address or is a fraudulent address (e.g., verified via, for example, website-based search-results), thus indicating a possible phishing attack and/or phishing operation. The computing device 12 may do so by comparing a textual context of the destination address with the destination address and observing a mismatch in the comparison thereby identifying that the resource comprises a destination address that is unauthorized (corresponding to a possible phishing attack, phishing operation, and/or otherwise unauthorized operation).

For example, a user may purchase items (e.g., physical items, software, services, or the like) from stores A, B, and C, and thus a computing device 12 of the user may identify that purchases were made from the stores A, B, and C. However, at a later time, the computing device 12 may identify that an incoming communication is from a store X and/or a store Y pretending to be the store A, B, or C but be associated with a different banking account, a different routing number, a different payment-collecting service and/or web site, a different mailing address or the like, such that a submitted payment to the store Y under guise as the store A, B, or C (e.g., mimicking, mimic) may be submitted to the banking accounts of the store Y instead of the store A, B, or C. When a communication pretends to be from a different store and/or pretends to be a valid purchase when indeed the information is fraudulent, the communication may be associated with a phishing operation, an example of a fraudulent operation detectable by the computing device 12. When the computing device 12 identifies the inconsistencies and/or that the communication is fraudulent (or potentially fraudulent), the computing device 12 may notify the user and permit thwarting of the fraudulent operation. In some cases, the computing device 12 may identify a number of differences between an expected communication from one of the stores A, B, or C and a communication from the store X or the store Y to identify when differences between the expected communication and received communication deviate by a threshold amount of differences.

In some cases, in response to determining that the second email may correspond to a phishing attack, the computing device 12 may execute any hyperlinks of the second email within a container. More generally, the computing device 12 may execute any unauthorized or suspicious links in a container to protect information and/or processes of the computing device 12 from attacks initiated by following a hyperlink. While executing hyperlinks in a sandbox and/or a container may enhance operations associated with email-based phishing attack identification, it should be understood that hyperlinks in a sandbox and/or a container may enhance security operations of a computing device 12 that does not use emails or communications to identify possible phishing attacks.

Figure 3:
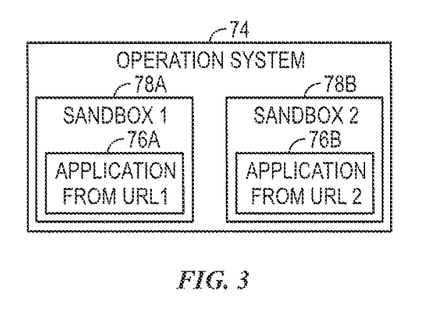
FIG. 3 is a block diagram of the computing device of FIG. 1 providing a sandbox to execute an application, such as an application associated with a phishing attack detected using the method of FIG. 2, in accordance with embodiments of the present techniques.

Keeping this in mind, FIG. 3 is a block diagram of an operating system 74 of the computing device 12 managing container-based executions of hyperlinks. When a hyperlink is followed, the operating system 72 may initiate execution of an application 76. For example, a first hyperlink (e.g., Uniform Resource Locator (URL)) may reference a web resource that causes the operating system 72 to download and/or execute an application 76A and/or a second hyperlink may reference a different web resource that causes the operating system 72 to download and/or execute an application 76B.

To improve security of the operating system 74, such as to preemptively mitigate undesirable applications 76 from being downloaded and/or executed directly within the operating system 74, the operating system 74 may download and/or execute the application 76 within a sandbox 78 and/or a container. In some cases, applications 76 are executed in sandboxes 78 and/or containers automatically and/or in response to a presumption that each hyperlink is unauthorized before the computing device 12 authorizes a destination address of the hyperlink (e.g., confirms that the destination address matches a context of the hyperlink, such as by text analysis performed using the method 50). While in the sandbox 78 and/or container, the application 76 is unable to reference files stored within the operating system 74 that the sandbox 78 is not already provided access to by the operating system 74. For example, when the application 76A is executed in the sandbox 78A, the application 76A is unable to access files or information stored on the computing device 12 and/or information accessible by the operating system 74 without permission from the operating system 74. When granted permission, files and/or information may be transmitted between the application 76 and the operating system 74. Selectively granting permission to cross a boundary between the sandbox 78 and the operating system 74 may barricade sensitive information and/or control of the computing device from unknown operators associated with the application 76.

Figure 4:
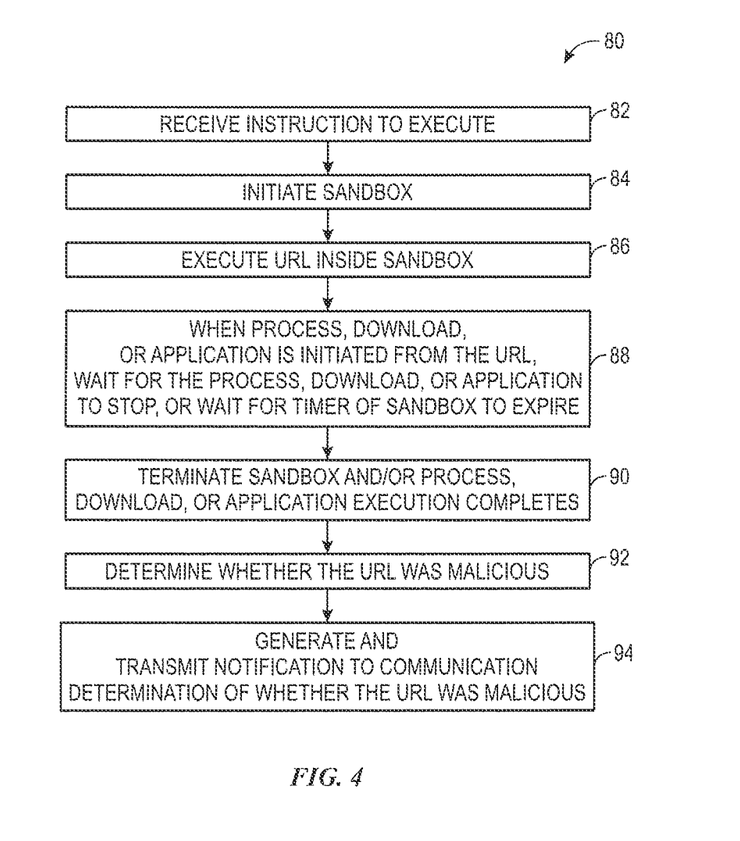
FIG. 4 is a flowchart of a method for detecting a malicious hyperlink, in accordance with embodiments of the present techniques.

To elaborate, FIG. 4 is a flowchart of an example method 80 for managing communications between the sandboxes 78 and/or container and the operating system 74. Although described as performed by the computing device 12 to manage access of the application 76A within the sandbox 78A to information associated with the operating system 74 and/or the computing device 12, it should be understood that any suitable computing device and/or portion of the computing device 12 may perform, or facilitate performing, the method 80. It should be understood that although the method 80 is presented in a particular order, any suitable order of operations may be used to perform the method 80. Furthermore, it should be understood that some or all of the performance of operations of the method 80 may be facilitated by a processor executing instructions stored on a tangible, non-transitory memory or storage device (e.g., such as a processor 16 executing instructions stored in the memory 14).

With the above in mind, at block 82, the computing device 12 may receive a first instruction to execute a URL. The instruction may be generated by one or more programs run by the processor 16 in response to receiving an input via an input device indicative of a hyperlink and/or a URL displayed on a graphical user interface being digitally "pressed." For example, the instruction may be generated in response to a user following a link in an email that the computing device 12 determined to be a possible phishing email, such as by using operations of the method 50.

At block 84, in response to receiving the first instruction, the computing device 12 may initiate a sandbox 78A and/or a container. The sandbox 78A may use programmatic methods and systems to separate processes executed inside the sandbox 78A from processes executed outside the sandbox 78A. For example, a portion of the memory 14 may be partitioned for use by the sandbox 78A without the process executed inside the sandbox 78A obtaining access to information stored outside the partition of memory 14.

At block 86, the computing device 12 may execute the URL inside the sandbox 78A. In some embodiments, execution of the URL inside the sandbox 78A may happen each time a link or URL is followed from a communication, such as from an email. Executing the URL inside the sandbox 78A may cause the application 76A to be executed inside the sandbox 78A. Executing the URL may cause the application 76A to be downloaded or executed and executing the application 76A in the sandbox 78A may protect the computing device 12 from unauthorized attempts of the application 76A to access information accessed by the operating system 74 and/or the computing device 12.

When the URL is executed, sometimes execution of a process, download, application, or the like, is initiated. When initiated, at block 88, the computing device 12 may wait for the execution of the process, download, and/or application to complete or finish, or else may wait for a timer to expire thereby setting an upper limit to an amount of time the process, download, and/or application may be permitted to execute. Thus, in some cases, the computing device 12 may protect against time-based attacks, where an unauthorized process, download, or application runs for undesirable amount of time (e.g., an amount of time greater than a threshold).

When the process, download, and/or application completes execution and/or when the timer expires, at block 90, the computing device 12 may terminate the sandbox 78A, and any process, download, and/or execute an application within the sandbox 78A (e.g., application 76A). Terminating the sandbox 78A and the contents of the sandbox 78A may also terminate any background and/or otherwise unauthorized programs initiated by the executed process, download and/or application to thwart hidden or underlying attacks, such as "Trojan" attacks.

In some cases, at block 92, the computing device 12 may perform a diagnosis to determine whether the URL was a malicious link, such as a link that caused an unrelated software or application to download and/or initiate performance of an unauthorized process and/or download. In this way, the computing device 12 may determine whether the destination presented by context of the URL matched a destination of the URL. The computing device 12 may analyze information presented and/or accessed by the operating system 74 outside of the sandbox 78A to determine whether the information presented and/or accessed by the operating system 74 inside the sandbox 78A was relevant to the information presented and/or accessed outside of the sandbox 78A. For example, the computing device 12 may determine whether the information inside the sandbox 78A (e.g., keywords, titles, context of keywords) has or crosses a threshold amount of similarity to information expected to be accessed within the sandbox 78A and/or information accessed outside the sandbox 78A when presented with the URL. In this way, when the computing device 12 accesses the URL as part of a clothing shopping web site interface and the URL leads to a download of a software program determined unrelated to the clothing shopping website interface, the computing device 12 may determine the URL to be malicious since it caused the performance of an unexpected or unrelated activity.

When the URL directed the computing device 12 to access a resource (e.g., process, download, application) that was deemed unrelated to a context that the URL was used in, the computing device 12, at block 92, may determine that the URL is likely a malicious URL and, at block 94, may generate and transmit a notification of the malicious URL in response to determining that the URL is malicious. The generated notification may be of the form of a pop-up window, alarm, or generated alert, such as a pop-up window that causes a user to provide an additional selection to open or follow the possibly malicious URL. In some cases, the generated notification may present a user with one or more options of how to respond to the URL, such as reporting the URL, reporting an email address or user associated with the URL, or the like. Responding to the URL may reduce a likelihood of unauthorized actions associated with the URL and/or an original generator of the URL affecting the computing device 12 at least in part by notifying additional systems or parties of the malicious activity, enabling the additional systems or parties to perform preventative operations in advance of executing the URL on additional computing devices.

In some cases, a container-based program execution may be used to protect information accessed from unauthorized access during a program execution. For example, a website portal used to access banking information of a user may be executed by the operating system 74 inside a container to protect the banking information from access by a program undetected by the operating system 74 and/or the user. In some cases, a web site may transmit an identifier to the computing device 12 when opened via the computing device 12 that indicates that the website requests a secure execution (e.g., a container-based program execution).

Figure 5:
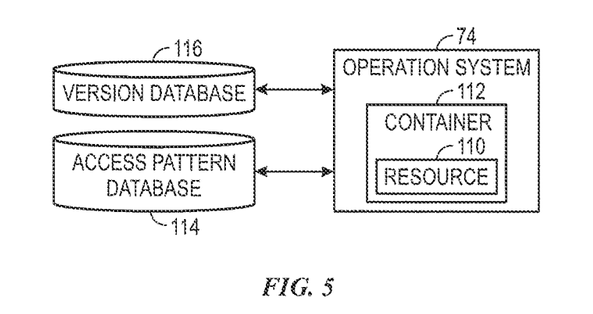
FIG. 5 is a block diagram of the computing device of FIG. 1 providing a container to execute a resource after confirmation that software to provide the container is up to date, in accordance with embodiments of the present techniques.

To help illustrate, FIG. 5 is a block diagram the operating system 74 of the computing device 12 managing container-based executions of resources 110. In this example, the computing device 12 causes the operating system 74 to execute the resource 110 (e.g., process, download, application, website) inside a container 112 to protect information of the resource 110 from unauthorized access by software external to the resource 110. The container 112 may prevent access of information of the resource 110 by the operating system 74 to reduce a likelihood (e.g., eliminate, reduce to zero) of an additional resource of the operating system 74 outside the container 112 accessing the information.

In some embodiments, the computing device 12 may monitor patterns in accesses of resources 110. When the resource 110 is accessed, the computing device 12 may store an indication of a time at which the resource 110 was accessed along with identifiers associated with the resource 110. Over time, the computing device 12 may identify access patterns associated with each respective resource 110 and may use the access patterns to predict when a resource 110 is expected to be accessed again. For example, the resource 110 may be a grocery website, and the computing device 12 may determine that the resource 110 is accessed each week on Sunday evening. This information may be stored in an access pattern database 114. The time and the identifiers may be stored in the access pattern database 114 as raw data, as part of identified patterns, or any combination thereof. For example, the raw data may be used to regularly verify a relevance of an identified pattern. In this way, the computing device 12 may identify when an access pattern changes or stops, such as when the grocery website is accessed on Monday morning instead of Sunday evening.

Using the resource access pattern database 114, the computing device 12 may verify that software of the computing device 12 is updated prior to a time of an expected usage of a resource. For example, the computing device 12 may identify that the resource 110 is expected to be accessed at a time T1 based on data stored in the access pattern database 114. Using this identification, the computing device 12 may determine to update or verify an update of the container 112 prior to the time T1, such that software of the container 112 is up-to-date and/or suitably updated by and/or at the time T1.

In this way, before the time T1, the computing device 12 may determine a current version of the container 112 from a version database 116. The version database 116 may identify the container 112 by way of an age identifier, a version identifier, a software identifier, or the like. The computing device 12 may determine a most-recent update version identifier for a respective software of the container 112. The computing device 12 may compare the most-recent update version identifier to the current version of the container 112 to determine whether the respective software of the container 112 is up to date.

When the current version of the container 112 does not match the most-recent update version identifier, the computing device 12 may proceed to update the software of the container 112. After the update of the software, the container 112 may correspond to a version identifier that matches the most-recent update version identifier. Automatically updating the software of the container 112 before a time of expected use of the resource 110 may improve operation of the computing device 12 by reducing a likelihood that the resource 110 is executed in outdated software of the container 112, where outdated software may be exploited by third-parties attempting to gain access to information of the resource 110 and/or the computing device 12.

It is noted that the container 112 is one example of a suitable method for isolating a process, application, software, download, or the like, from the operating system 74. Other methods and/or systems may be used to isolate software and/or programmatic functions from affecting or accessing information associated with the operating system 74 and/or the computing device 12. For example, a container may be equivalently provided by a zone, a virtual private server, a partition, a virtual environment, a virtual kernel, a computing jail, or the like since each refer to an operating system paradigm in which a kernel permits existence of multiple, isolated, user space instances. It is also noted that the operating system 74 may support one or more containers 112. Each of the one or more containers 112 may execute software at least partially in parallel to permit one execution within a first container 112 to be isolated from a second execution within a second container 112. Both of the executions may be isolated from information associated with execution of the operating system 74 and/or the computing device 12 since one or both of the executions may be denied access to the information or use an additional authorization to gain access to the information.

Figure 6:
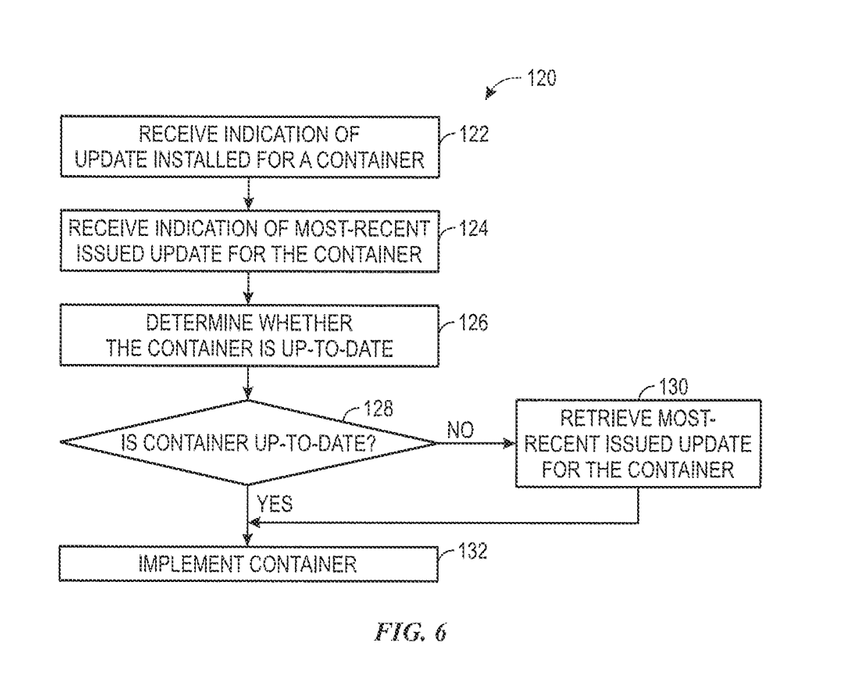
FIG. 6 is a flowchart of a method for verifying that the software to provide the container is up to date, in accordance with embodiments of the present technique.

To help elaborate, FIG. 6 is a flowchart of an example method 120 for managing updates of the container 112. Although described as performed by the computing device 12 to manage updates of the container 112, it should be understood that any suitable computing device and/or portion of the computing device 12 may perform, or facilitate performing, the method 120. It should be understood that although the method 120 is presented in a particular order, any suitable order of operations may be used to perform the method 120. Furthermore, it should be understood that some or all of the performance of operations of the method 120 may be facilitated by a processor executing instructions stored on a tangible, non-transitory memory or storage device (e.g., such as a processor 16 executing instructions stored in the memory 14).

With the above in mind, at block 122, the computing device 12 may receive an indication of an update installed for the container 112. The computing device 12 may receive a software identifier and/or a version identifier from version database 116 that corresponds to software used to support execution of the container 112. The software that supports execution of the container 112 (e.g., that provides the container 112) may be updated after a time of installation, such as to fix bugs or operational loopholes in underlying code of the software, to enhance features of the software, or the like. When the software that provides the container 112 is updated, a version identifier corresponding to the software may be updated in the version database 116. In this way, the version database 116 may store updated information of the versions of software used to provide the container 112 and/or other containers of the operating system 74. In some cases, a hash or hash-based functions may be used to communicate versions of the container 112 and/or to provide the container 112. For example, the version of the container 112 may be an encrypted value to be decrypted by the operating system 74 and/or information within the container 112 may be protected by hash-based encryption such that the operating system 74 is unable to translate encrypted information into data readable by the operating system 74.

At block 124, the computing device 12 may receive an indication of a most-recent issued update for the container 112 (e.g., for the software providing the container 112). The indication may be a software identifier and/or a version identifier defined by a third-party and/or an information repository as the most-recently issued update for the software that provides the container 112. At block 126, the computing device 12 may determine whether the container 112 is up-to-date relative to the software identifier and/or the version identifier received at block 124. In this way, the computing device 12 may compare the software identifier and/or the version identifier received at block 122 to the software identifier and/or the version identifier received at block 124 to determine if the identifiers are different.

At block 128, when the identifiers are different, the computing device 12 may determine that the container 112 is not up-to-date, and thus may, at block 130, retrieve a most-recently issued update for the software providing container. The computing device 12 may download the update from a third-party provided website or platform that may correspond to a producer or developer of the software. Sometimes the computing device 12 may access the software update as a stored file on a physical storage medium, such as a compact disk (CD). In some embodiments, the update may automatically download from the hosting platform (e.g., third-party provided website or platform, website) to the computing device 12 for implementation (e.g., installation) at block 130 (e.g., at a later time than a time of download).

After the software is updated, at block 132, the computing device 12 may implement the container 112. Similarly, at block 128, when the computing device 12 determines that the identifiers are substantially similar (e.g., when a determined amount of similarity has a value that crosses a threshold amount of similarity), the computing device 12 may proceed to, at block 132, implement the container 112 via the software. Implementing the container 112 may include instructing the software to provide the container 112. For example, when the computing device 12 implements the container 112, the computing device 12 may instruct the software to generate hash encrypted values to isolate the execution of a program within the container 112 from an execution of a program external to the container 112, such as a program of the operating system 74 and/or of the computing device 12. Isolation may proceed while programs outside the container 112 do not have access to a key used to decrypt values within the container 112. It is noted that when the resource 110 is determined to be authorized and the operating system 74 is determined to not have any unauthorized programs loaded, permission may be provided to the operating system 74 to cross a boundary of the container 112 and permit the exchange of information between the resource 110 and the operating system 74 and/or the computing device 12. The resource 110 may enable communication by sharing the key with the operating system 74. In some embodiments, the resource 110 may authenticate itself to the computing device 12, such as in the case of a reverse-containerization operation that may be used to preemptively isolate access of sensitive websites from the computing device 12. However, in some embodiments, the computing device 12 may authenticate the resource 110 and verify that the resource 110 is not malicious, such as in the case of container-based executions of hyperlinks (e.g., described with regard to FIG. 3).

Authentication may include providing a one-time certificate between the computing device 12 and the resource 110 to enable communication of the encrypted values. The one-time certificate may be issued on a per-transaction basis or conditional basis (e.g., a duration of time, a number of transactions) to authorize the resource 110 to communicate with the computing device 12. After the duration of time passes or the number of transactions is reached (e.g., when a counter maintaining the number of transactions increments or decrements to a value equally the number of transactions), the certificate expires and the resource is blocked from accessing one or more datasets of the computing device 12. Furthermore, the certificate may be reissued on a periodic or regular basis such that if a change were to occur at either the resource 110 and/or the computing device 12, the permission of communication may end. For example, if the computing device 12 is hacked in the middle of an authorized communication with the resource 110, minimal information may be lost since at the next providing of a one-time certificate access may not be granted between the computing device 12 and/or the resource 110. The one-time certificate may be a time or transaction-based certificate, where permission for communication is granted for a duration defined by a threshold. For example, the threshold may correspond to a duration of time (e.g., time-based certificate) and/or a number of transactions (e.g., transaction-based certificate) that communication is permitted between the resource 110 and the computing device 12. In this way, the certificate may indicate that a resource, at a first time, includes or is associated with an unauthorized use, is classified as an unauthorized resource, or the like to generally indicate a lack of authorization, and may later, at a second time, indicate that the resource includes or is associated with an authorized use, is classified as an authorized resource, or the like to generally indicate authorization. When unauthorized, the resource may not be permitted to access data outside or beyond container (or a programmed boundary of the container). However, when unauthorized, the resource may be permitted to access data outside or beyond container (or a programmed boundary of the container). Furthermore, when the certificate expires (e.g., after a threshold amount of time passes, after a threshold number of transactions occur), the resource may become an unauthorized resource until the certificate is changed to indicate authorization of the resource. While unauthorized, the resource is blocked from accessing one or more datasets (e.g., any data) outside of the container.

For each of the methods 50, 80, and 120, the computing device 12 may detect a phishing operation and perform an operation in response to detecting the phishing operation. For example, in the method 120, implementing the container 112 may involve a one-time certificate (e.g., the computing device 12 providing the one-time certificate, the resource 110 providing the one-time certificate). When a trust level provided between the computing device 12 and the resource 110 changes, such as going from a trusted state (e.g., indicated via providing of the one-time certificate) to an untrusted state (e.g., indicated via being declined to be provided the one-time certificate), the computing device 12 may generate an alert that indicates a likelihood of a phishing attack and/or a likelihood of an ongoing cyber-attack. Likelihoods of attacks may be determined in combination of other techniques described herein. Indeed, a trust level may be a binary value or indication (e.g., trusted v. untrusted), an analog value representative of a current trust level between a minimum and maximum value, a relative trust value where resources or entities are ranked against each other to provide different levels of access to resources, or the like. A trust value may automatically adjust a level of access outside the container, and may include definitions of selective accesses (e.g., a first range of trust level values are permitted to access a subset of data outside the container, a second range of trust level values are permitted to access all data outside the container, and an nth range of trust level values are not permitted to access any data outside the container). For example, determining that a URL is malicious may yield one likelihood, while the combination of the URL being malicious and a trust level change occurring may yield a different likelihood (e.g., relatively greater likelihood). Alerts generated may include a notification in the form of an image to be displayed on a display of the computing device 12 (e.g., a pop-up notification), in the form of an email to be transmitted on behalf of an operator of the computing device 12, in the form of a maintenance request transmitted to an operator to be addressed, or the like.

Thus, technical effects of the present disclosure include techniques for improved monitoring systems. These techniques describe systems and methods for detecting phishing operations that may otherwise be undetectable by a computing system and/or an operator of a computing system. The computing device may detect a phishing activity when a link or communication indicates a change in destination than what is expected from previous communications and/or known purchase or communication information. For example, known purchase data may be compared against unverified receipt (invoice) data to determine if the invoice is authorized and corresponding to the purchase data. To provide additional protection against phishing activities, URLs and hyperlinks may be automatically executed within containers (e.g., container-based execution of hyperlinks) and/or sensitive websites and/or processes may be protected from phishing activities by executing the sensitive website and/or process within a container (e.g., reverse containerization). By improving phishing activity detection and prevention, operation of the computing device may improve by permitting a computing device to automatically detect and counteract phishing operations and/or effects of phishing operations.

The specific embodiments described above have been shown by way of example, and it should be understood that these embodiments may be susceptible to various modifications and alternative forms. It should be further understood that the claims are not intended to be limited to the particular forms disclosed, but rather to cover all modifications, equivalents, and alternatives falling within the spirit and scope of this disclosure.

The techniques presented and claimed herein are referenced and applied to material objects and concrete examples of a practical nature that demonstrably improve the present technical field and, as such, are not abstract, intangible or purely theoretical. Further, if any claims appended to the end of this specification contain one or more elements designated as "means for [perform]ing [a function] . . . " or "step for [perform]ing [a function] . . . ", it is intended that such elements are to be interpreted under 35 U.S.C. 112(f). However, for any claims containing elements designated in any other manner, it is intended that such elements are not to be interpreted under 35 U.S.C. 112(f).

The invention claimed is:

1. A method for operating a phishing detection system of a computing device, comprising:
   analyzing, via the computing device, a first communication to determine a first dataset generated in response to the first communication, wherein the first communication comprises an electronic mail (email)-based communication comprising unverified invoice data;
   analyzing, via the computing device, a second communication to determine an expected dataset, wherein the second communication comprises an email-based communication comprising known purchase data;
   determining, via the computing device, that the first dataset comprises a threshold amount of deviation from the expected dataset generated based at least in part on the second communication received before or with the first communication;
   in response to determining that the first dataset comprises the threshold amount of deviation from the expected dataset, detecting, via the computing device, a likely phishing operation; and
   based upon detecting the likely phishing operation, executing, via the computing device, a hyperlink of the first communication within a container provided by an operating system of the computing device, wherein the container comprises a programmed boundary that restricts access outside the programmed boundary.

2. The method of claim 1, comprising generating, via the computing device, the expected dataset based at least in part on identifying keywords of the second communication.

3. A method for operating a phishing detection system of a computing device, comprising:
   receiving, via the computing device, a first dataset generated in response to a first communication;
   determining, via the computing device, that the first dataset comprises a threshold amount of deviation from an expected dataset generated based at least in part on a second communication received before or with the first communication;
   in response to determining that the first dataset comprises the threshold amount of deviation from the expected dataset, detecting, via the computing device, a likely phishing operation; and
   based upon detecting the likely phishing operation, executing, via the computing device, a hyperlink of the first communication within a container provided by an operating system of the computing device, wherein the container comprises a programmed boundary that restricts access outside the programmed boundary; and
   accessing, via the computing device, a resource access pattern corresponding to a resource and, before a time of next expected access to the resource, determining to update software of the container.

4. A tangible, non-transitory computer-readable medium configured to store instructions executable by a processor of an electronic device that, when executed by the processor, cause a computing device to perform operations comprising:
   receiving a first text dataset generated in response to a first communication;
   determining, via the computing device, that the first text dataset comprises a threshold amount of deviation from an expected text dataset generated based at least in part on a second communication received before the first communication;
   in response to determining that the first text dataset comprises the threshold amount of deviation from the expected text dataset, detecting, via the computing device, a possible phishing operation;
   accessing a hyperlink to be executed within a container data structure, wherein the container data structure is provided by an operating system of the computing device and is configured to provide a programmed boundary within at least a memory of the computing device, enabling functions of the hyperlink execution to access only a first portion of the memory within the programmed boundary, while restricting the functions of the hyperlink execution from access to a second portion of the memory outside the programmed boundary;
   in response to detecting the possible phishing operation, executing the functions of the hyperlink within the container data structure to, at a first time, restrict the functions of the hyperlink execution from access to a dataset in the second portion of the memory; and
   at a second time, refraining from restricting the functions of the hyperlink execution from access to the dataset, by issuing a one-time certificate to the functions of the hyperlink execution, permitting the functions of the hyperlink execution access to the dataset.

5. A tangible, non-transitory computer-readable medium configured to store instructions executable by a processor of an electronic device that, when executed by the processor, cause a computing device to perform operations comprising:
   accessing a resource to be executed within a container data structure, wherein the container data structure is configured to provide a programmed boundary within at least a memory of the computing device, enabling resource access to only a first portion of the memory within the programmed boundary, while restricting the resource access to a second portion of the memory outside the programmed boundary;
   executing the resource within the container data structure;
   at a first time, restricting access of the resource to a dataset in the second portion of the memory;

generating a one-time certificate in response to authorizing a first communication corresponding to the resource at least in part by:
  analyzing, via the computing device, the first communication to identify a first dataset;
  analyzing, via the computing device, a second communication to identify a second dataset;
  comparing, via the computing device, the first dataset and the second dataset to quantify a numerical amount of difference between the first dataset and the second dataset; and
  authorizing, via the computing device, the resource after determining that the numerical amount of difference crosses a threshold; and
at a second time, refraining from restricting the access of the resource to the dataset, by issuing the one-time certificate to the resource, permitting the access of the resource to the dataset.

6. The non-transitory computer-readable medium of claim 5, wherein the second communication comprises a first electronic mail (email)-based communication, and wherein the first communication comprises a second electronic mail (email)-based communication received later in time than the second communication.

7. The non-transitory computer-readable medium of claim 5, wherein comparing the first dataset and the second dataset comprises:
  parsing the first dataset to extract a store name, a store address, a store phone number; a purchase amount, or any combination thereof;
  parsing the second dataset to extract an expected store name, an expected store address, an expected store phone number; an expected purchase amount, or any combination thereof; and
  comparing the parsed first dataset and of the parsed second dataset to quantify the numerical amount of difference between data of the parsed first dataset and data of the parsed second dataset.

8. The non-transitory computer-readable medium of claim 5, wherein the one-time certificate is generated in response to determining that information presented or accessed by the computing device outside of the container data structure was relevant to information presented or accessed by the computing device inside of the container data structure.

9. A computing device, comprising:
  a processor; and
  memory, comprising computer-readable instructions that, when executed by the processor, cause the processor to perform operations comprising:
  accessing a resource to be executed within a container data structure, wherein the container data structure is configured to provide a programmed boundary within at least a memory of the computing device, enabling resource access to only a first portion of the memory within the programmed boundary, while restricting the resource access to a second portion of the memory outside the programmed boundary;
  executing the resource within the container data structure;
  at a first time, restricting access of the resource to a dataset in the second portion of the memory;
  generating a one-time certificate in response to authorizing a first communication corresponding to the resource at least in part by:
    analyzing, via the computing device, the first communication to identify a first dataset;
    analyzing, via the computing device, a second communication to identify a second dataset;
    comparing, via the computing device, the first dataset and the second dataset to quantify a numerical amount of difference between the first dataset and the second dataset; and
    authorizing, via the computing device, the resource after determining that the numerical amount of difference crosses a threshold; and
  at a second time, refraining from restricting the access of the resource to the dataset, by issuing the one-time certificate to the resource, permitting the access of the resource to the dataset.

10. The computing device of claim 9, wherein the second communication comprises a first electronic mail (email)-based communication, and wherein the first communication comprises a second electronic mail (email)-based communication received later in time than the second communication.

11. The computing device of claim 9, wherein comparing the first dataset and the second dataset comprises:
  parsing the first dataset to extract a store name, a store address, a store phone number; a purchase amount, or any combination thereof;
  parsing the second dataset to extract an expected store name, an expected store address, an expected store phone number; an expected purchase amount, or any combination thereof; and
  comparing the parsed first dataset and of the parsed second dataset to quantify the numerical amount of difference between data of the parsed first dataset and data of the parsed second dataset.

12. The computing device of claim 9, the operations comprising:
  receiving a first text dataset generated in response to the first communication;
  determining, via the computing device, that the first text dataset comprises a threshold amount of deviation from an expected text dataset generated based at least in part on the second communication received before the first communication;
  in response to determining that the first text dataset comprises the threshold amount of deviation from the expected text dataset, detecting, via the computing device, a possible phishing operation; and
  in response to detecting the possible phishing operation, executing, via the computing device, a hyperlink of the first communication within the container data structure provided by an operating system of the computing device.

13. The computing device of claim 9, wherein the one-time certificate is generated in response to determining that information presented or accessed by the computing device outside of the container data structure was relevant to information presented or accessed by the computing device inside of the container data structure.

* * * * *